June 14, 1932. A. ROBBINS 1,863,550
FLOATING WATER WHEEL
Original Filed May 6, 1930  2 Sheets-Sheet 1
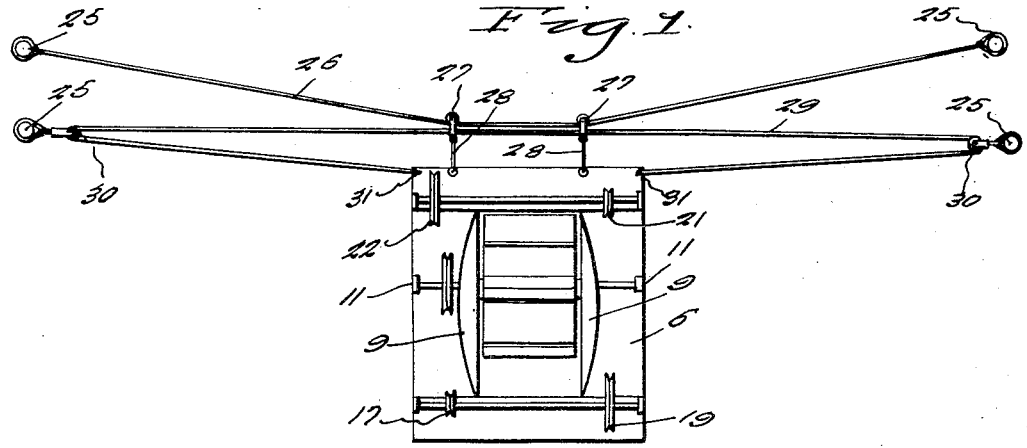
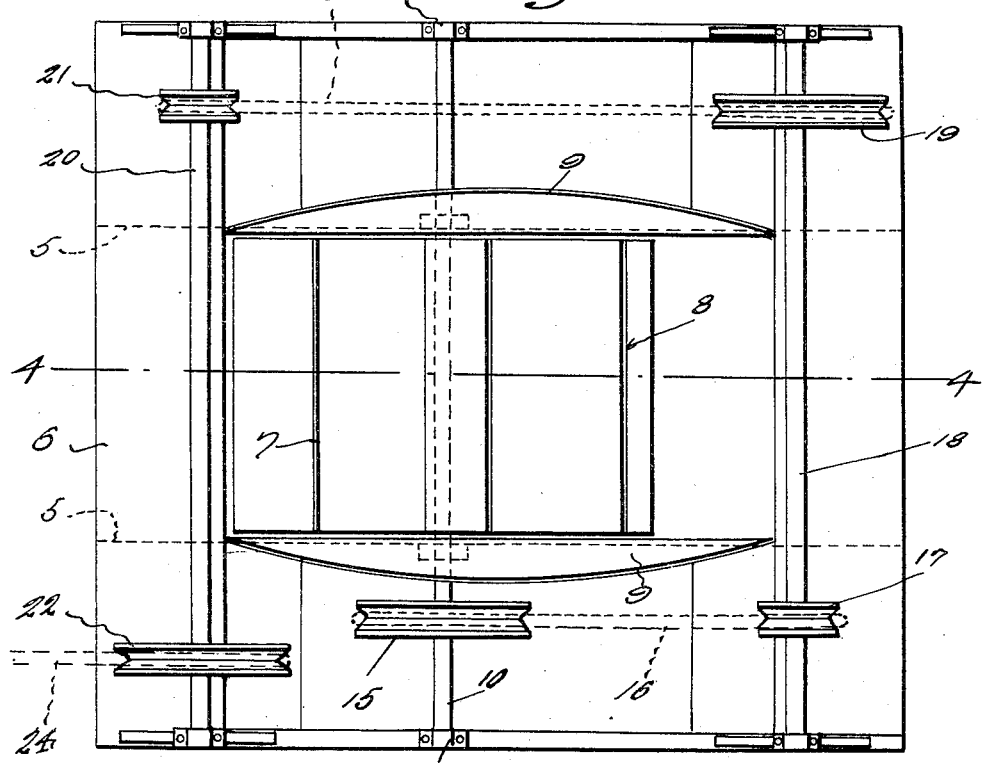
Inventor
Alvin Robbins
By Clarence A. O'Brien
Attorney June 14, 1932.  A. ROBBINS  1,863,550
FLOATING WATER WHEEL
Original Filed May 6, 1930  2 Sheets-Sheet 2

Inventor
Alvin Robbins

By Clarence A. O'Brien
Attorney

Patented June 14, 1932

1,863,550

UNITED STATES PATENT OFFICE

ALVIN ROBBINS, OF DOUGLAS, WYOMING

FLOATING WATER WHEEL

Application filed May 6, 1930, Serial No. 450,191. Renewed November 3, 1931.

This invention appertains to new and useful improvements in water wheels adapted for producing power.

The principal object of the invention is to provide a water wheel capable of being floated on a stream or other body of water, thus reducing the cost of construction.

Other important objects and advantages of the invention will readily become apparent as the invention is better understood from the following specification and claim.

In the drawings:—

Figure 1 represents a top plan view of the novel water wheel anchored to float in a stream.

Fig. 2 represents a top plan view of the novel water wheel on a larger scale than that shown in Fig. 1.

Figure 3:
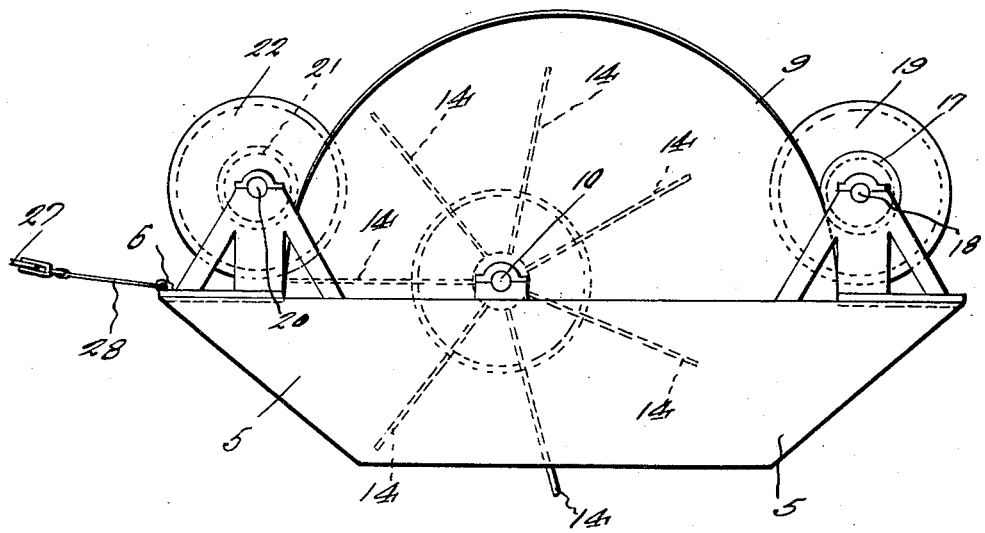
Fig. 3 represents a side elevational view of the novel water wheel.
Figure 4:
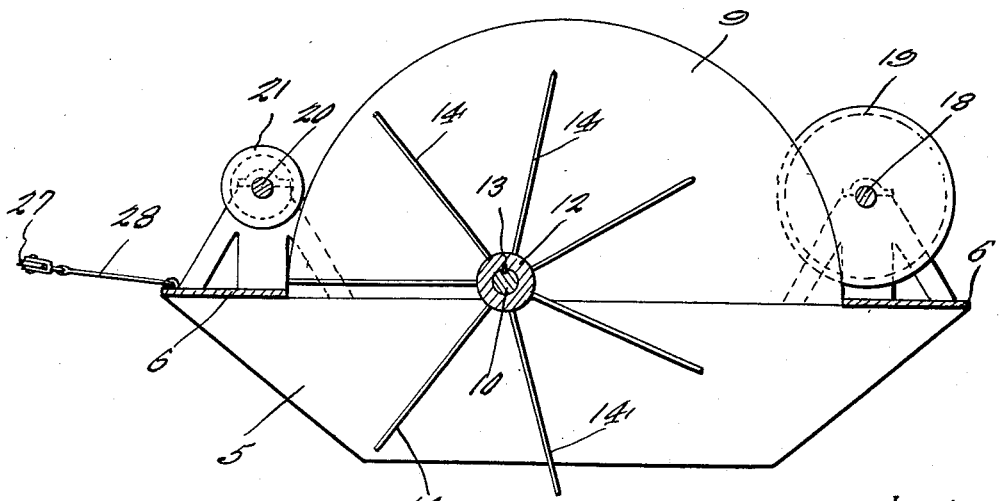
Fig. 4 represents a cross sectional view taken substantially on the line 4—4 of Fig. 2.

Referring to the drawings wherein like numerals designate like parts, it can be seen that the novel water wheel includes a pair of pontoons 5—5 supporting a platform 6. This platform 6 is provided with a rectangular-shaped opening 7 therein to accommodate the water wheel generally referred to by the numeral 8.

As is clearly shown in Fig. 2, a pair of semi-circular shaped shields 9—9 pivotally from the top surface of the platform 6 and these shields are located at opposite sides of the aforementioned opening 7.

A shaft 10 is disposed through the said shields 9—9 and has its ends journaled in the bearings 11—11. On the shaft 10 and between the shields 9—9 is the sleeve 12, keyed to the shaft 10 as at 13. This sleeve 12 has a plurality of paddles 14 radiating therefrom, and the same with the sleeve 12 forms the paddle wheel generally referred to by the numeral 8.

A pulley 15 is mounted on the shaft 10 at the outer side of one of the shields 9 and a belt 16 is engaged therewith and trained over a smaller pulley 17 or a circuit shaft 18. This second-mentioned shaft 18 is equipped with a pulley 19 substantially the same size as the pulley 15.

A third shaft 20 is located on the platform 6 and carries a rather small pulley 21 and a larger pulley 22. A belt 23 is trained over the pulleys 19 and 21, while a belt 24 serves so take the ultimate power from the pulley 22.

As is clearly shown in Fig. 1, a pair of anchors 25—25 is provided on each shore of the stream from a corresponding pair of anchors on the opposite shores of the stream, a cable 26 extends, and is engaged by the pulleys 27—27 secured to the platform 6 by the connectors 28.

These pulleys 27—27 include yokes and through these yokes, a second cable 29 is disposed, and is trained around pulleys 30 on the remaining anchors 25 to connect at its ends to the platform 6 as at 31. The cable 26 prevents the wheel from moving downstream, while the cable 28 stabilizes the wheel to prevent rocking and also to serve as a guide for lateral shifting.

Thus, the novel water wheel construction may shift with the current of the stream, without diminishing or increasing the power output thereof.

While the foregoing description sets forth the invention in specific terms, it is to be understood that numerous changes in the shape, size, and materials may be resorted to without departing from the spirit and scope of the invention as claimed hereinafter.

Having thus described my invention, what I claim as new is:—

In combination with a floating water wheel, means for anchoring and permitting said wheel to shift automatically with the stream comprising a pulley anchored on each bank of the stream on opposite sides of the platform of said water wheel, a cable trained around said pulley and having its end fixed to opposite sides of the platform, an anchor on each bank spaced from said pulley, a second cable stretched across the stream and fixed to the last named anchors, and means slidably connecting said second cable to the platform.

In testimony whereof I affix my signature.

ALVIN ROBBINS.